United States Patent
Chu

(10) Patent No.: US 6,469,962 B2
(45) Date of Patent: Oct. 22, 2002

(54) METHOD FOR DETECTING RUNNING SPEED OF SLEDGE MOTOR IN OPTICAL STORAGE DEVICE

(75) Inventor: Meng-Huang Chu, Taipei (TW)

(73) Assignee: VIA Technologies, Inc., Taipei Hsien (TW)

( * ) Notice: Subject to any disclaimer, the term of this patent is extended or adjusted under 35 U.S.C. 154(b) by 114 days.

(21) Appl. No.: 09/754,462

(22) Filed: Jan. 4, 2001

(65) Prior Publication Data

US 2001/0015941 A1 Aug. 23, 2001

(30) Foreign Application Priority Data

Feb. 17, 2000 (TW) .................................. 89102694 A

(51) Int. Cl.⁷ ................................................ G11B 7/00
(52) U.S. Cl. .................. 369/44.28; 369/53.28; 369/53.3
(58) Field of Search .......................... 369/44.27, 44.28, 369/44.29, 44.32, 44.35, 47.38, 47.39, 47.44, 47.45, 47.55, 53.28, 53.3, 53.25

(56) References Cited

U.S. PATENT DOCUMENTS 5,365,060 A * 11/1994 Shirai ..................... 250/231.16
5,768,229 A * 6/1998 Ikeda ....................... 369/44.28
5,870,356 A * 2/1999 Ikeda ....................... 369/44.28

* cited by examiner

Primary Examiner—Paul W. Huber
(74) Attorney, Agent, or Firm—J.C. Patents

(57) ABSTRACT

A method for detecting the speed of a sledge motor in an optical storage device. In response to a track jumping command, a tracking servo output signal is expanded onto an orthogonal space to obtain simulation parameters corresponding to the tracking servo output signal. A pseudo-tracking servo output signal is generated according to the simulation parameters of the tracking servo output signal. Then, the pseudo-tracking servo output signal is used to compute the speed of the sledge motor.

15 Claims, 3 Drawing Sheets

METHOD FOR DETECTING RUNNING SPEED OF SLEDGE MOTOR IN OPTICAL STORAGE DEVICE

CROSS-REFERENCE TO RELATED APPLICATION

This application claims the priority benefit of Taiwan application serial no. 89,102,694, filed Feb. 17, 2000.

BACKGROUND OF THE INVENTION

1. Field of the Invention

The present invention relates to a method of controlling an optical disk system. More particularly, the present invention relates to a method for detecting the running speed of a sledge motor inside an optical disk system.

2. Description of Related Art

The optical pickup head of most optical disk system such as a compact disk-read only memory (CD-ROM) drive or digital versatile disk (DVD) drive must track before reading data from the optical disk. At present, CD-ROM is only capable of detecting the velocity feedback signal in long track jumps. In newer CD-ROM and DVD system, a feedback signal of error tracking can be detected using a photo-interrupt method instead of velocity feedback.

FIG. 1 is a conventional control circuit diagram of a sledge motor and an actuator. As shown in FIG. 1, the sledge motor 18 is coupled to the actuator 20. The actuator 20 is capable of driving an optical pickup head 22. The sledge motor 18 and the actuator 20 are driven by a power driver 16. The running speed of the sledge motor 18, the running speed of the actuator 20 and the run-out speed of the disk are amplified by a pre-amplifier 10. Signal from the pre-amplifier 10 is fed back to a track/velocity sensor 12. The track/velocity sensor 12 generates velocity feedback signal to a seek control circuit 14 according to the signal from the pre-amplifier 10. As soon as the seek control circuit 14 picks up information including the velocity feedback signal, the jump track command and the track number, a track servo output (TRO) signal and a sledge motor voltage output (FMO) signal are produced. The TRO signal and the FMO signal are fed to a power amplifier 16 so that motion of the actuator 20 and the sledge motor 18 are in control.

FIG. 2 is a schematic diagram showing a long track jumping and a short track jumping of an optical pickup head. In a long track jumping, after the seek control circuit 14 picks up data including the velocity feedback signal, the jump track command, the track number, the pick-up head moves from position A to position B. In other words, the optical pickup head moves from track 30a to track 30b of the disk 30. Similarly, in a short track jumping, tthe pick-up head moves from track 30b to 30c.

In general, the velocity feedback signal of long track jumping in an optical storage device is equal to the vector sum from the running speed of the sledge motor, the running speed of the actuator and the run-out speed of the disk. Before any track-jumping operations are carried out, speed of the driving motor must first be known. Track jumping is best when the motor is motionless or moves slowly both in beginning and end of the track jumping. However, the velocity feedback signal for a long track jumping of the optical pickup head includes the running speed of the actuator and the run-out speed of the disk as well. Hence, it is probably to detect a relatively high speed when the motor is stopped. In other words, the actual speed of the motor is difficult to detect. Without the precise running speed of the motor, subsequent tracking after a track-jumping operation is not made and reading from the optical disk system is delayed.

In brief, since a conventional optical disk system cannot detect the actual running speed of the sledge motor or decide if the motor is stationary after a track-jumping operation, subsequent tracking of the optical disk system is difficult.

SUMMARY OF THE INVENTION

Accordingly, one object of the present invention is to provide a method for detecting the running speed of a sledge motor within an optical disk system by removing velocity feedback signal produced by other elements.

A second object of this invention is to provide a method for controlling an optical disk system. By eliminating other velocity feedback signals contributed by other sources, running speed of the motor can be obtained.

A third object of this invention is to provide a method for detecting the running speed of a sledge motor within an optical disk system by simulating the tracking servo output signal. Consequently, only the velocity feedback signal produced by the sledge motor is retained and hence accurate track jumping is obtained.

To achieve these and other advantages and in accordance with the purpose of the invention, as embodied and broadly described herein, the invention provides a method for detecting the sledge motor running speed in an optical disk system. A method for detecting the speed of a sledge motor in an optical storage device. In response to a track jumping command, a tracking servo output signal is expanded onto an orthogonal space to obtain simulation parameters corresponding to the tracking servo output signal. A pseudo-tracking servo output signal is generated according to the simulation parameters of the tracking servo output signal. Then, the pseudo-tracking servo output signal is used to compute the speed of the sledge motor.

The orthogonal space can be established through sine and cosine functions so that amplitude and phase of the tracking servo output signal becomes amplitude and phase of the pseudo-tracking servo output signal. Furthermore, the pseudo-tracking servo output signal is obtained from various sampling intervals so that the pseudo-tracking servo output signal and the tracking servo output signal have a similar waveform.

In this invention, the velocity components within the velocity feedback signals not generated by the sledge motor are eliminated by the pseudo-tracking servo output. Hence, running speed of the sledge motor can be determined accurately, and track-jumping operations can be carried out efficiently within the compact disk system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
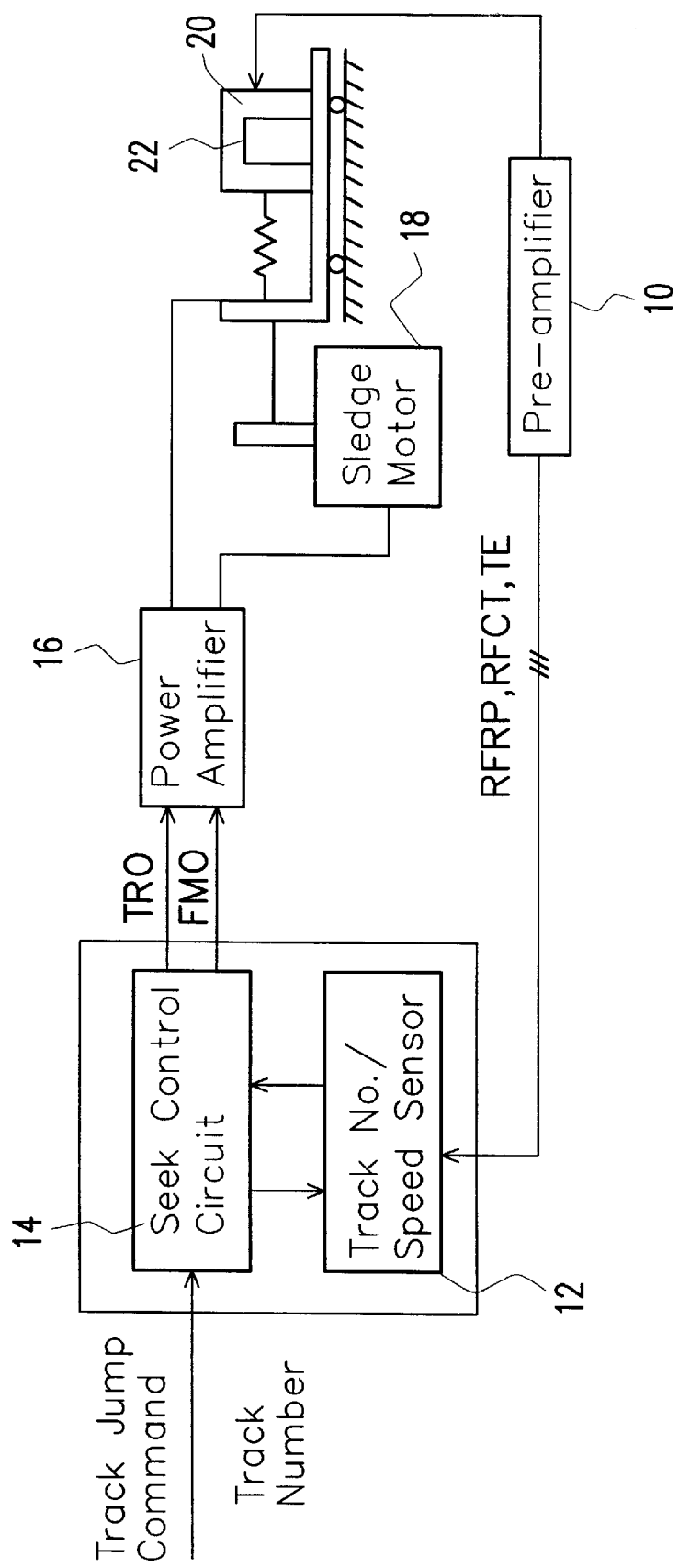
FIG. 1 is a conventional control circuit diagram of a sledge motor and an actuator.
Figure 2:
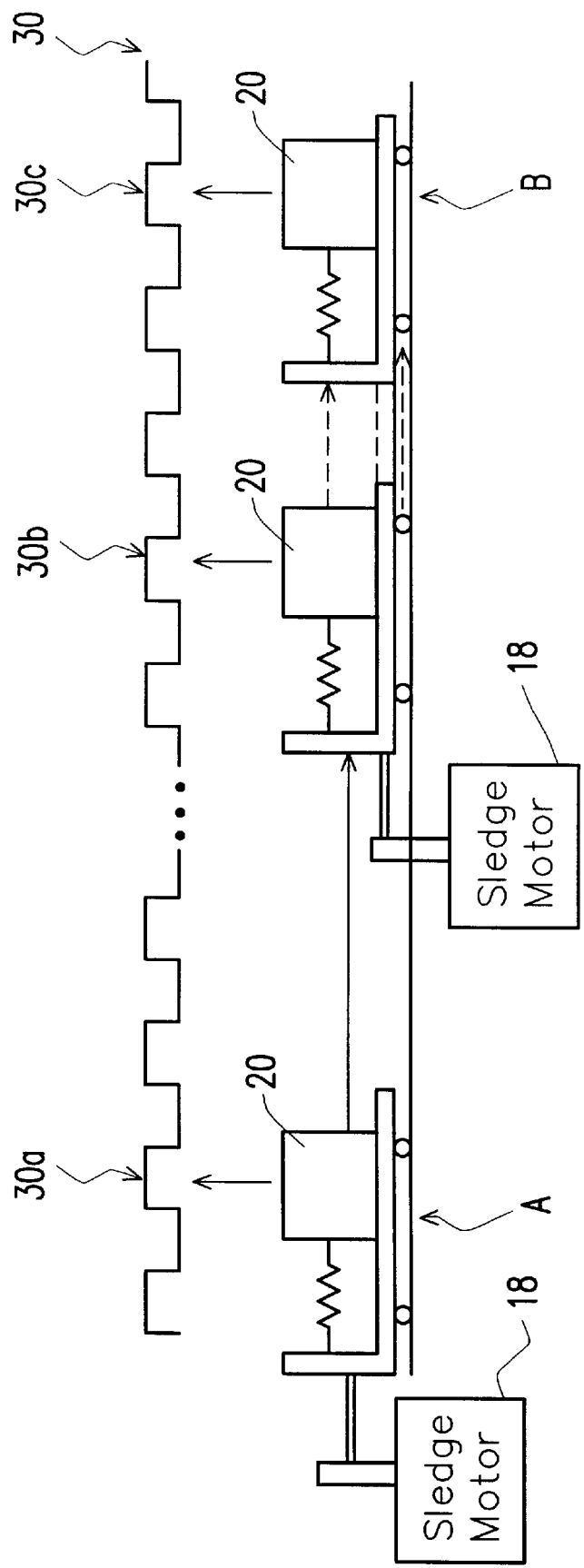
FIG. 2 is a schematic diagram showing a long track jumping and a short track jumping of an optical pickup head in the prior art.

Reference will now be made in detail to the present preferred embodiments of the invention, examples of which are illustrated in the accompanying drawings. Wherever possible, the same reference numbers are used in the drawings and the description to refer to the same or like parts.

In this invention, tracking servo output (TRO) signal is simulated so that pseudo-tracking servo output (pseudo TRO) signal having a waveform similar to the TRO signal is produced. Velocity feedback components in the velocity feedback signal produced by sources other than a sledge motor are eliminated so that the motor speed is accurately obtained. The TRO signal is based on the eccentricity of the optical disk as well as tracking error. The TRO signal is fed to a compensator for compensating, and then submitted to the tracking servo for producing an output control voltage that ensures tracking precision.

The velocity feedback signal of the optical disk system includes a vector sum of the speed signal from the sledge motor and the actuator, and the run-out speed signal from the disk. Hence, to execute a track jumping operation, the optical disk system needs to obtain the precise running speed of the sledge motor. The best condition is when the motor is motionless or moves slowly both in beginning and end of a track-jumping operation.

Since the actuator in motion will follow the movement of the disk, there is a definite speed relationship between the actuator and the disk when data is read from the optical disk normally. Hence, if a pseudo signal capable of eliminating the vector sum of the actuator running speed and the disk run-out speed is produced, running speed of the motor can be accurately obtained. For a constant angular velocity (CAV) system, the run-out speed of a disk in angular is fixed.

To simulate the pseudo signal for eliminating the vector sum of the actuator running speed and the disk run-out speed, a software program is used to generate PTRO signal from TRO signal. The TRO signal is also known as tracking drive (TRDRV) signal or tracking filter DAC analog output (TAO) signal. In this invention, the term TRO signal is used but the scope of this invention is not limited.

Figure 3:
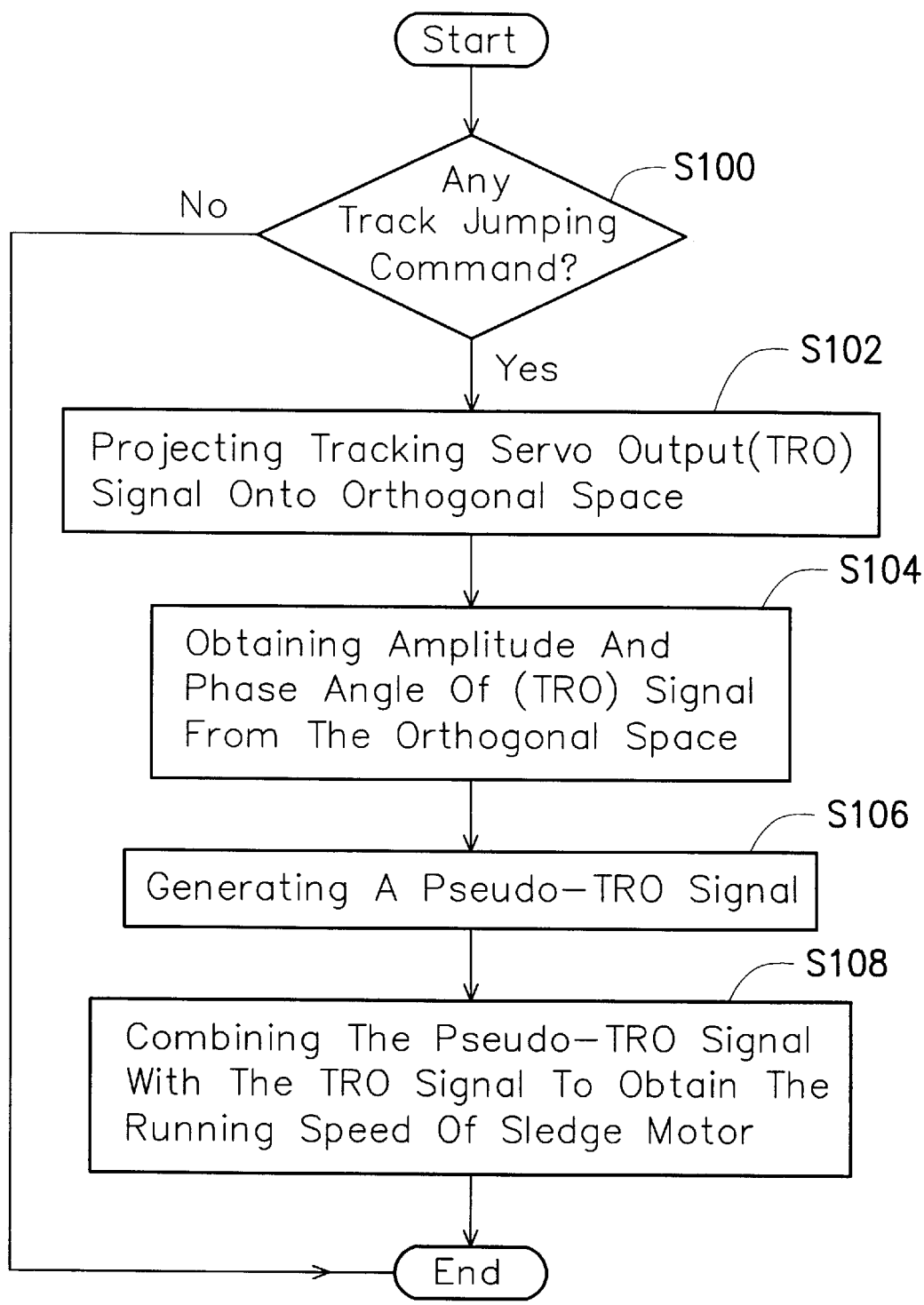
FIG. 3 is a block diagram showing the steps for detecting the running speed of a sledge motor within an optical disk system according to this invention.

FIG. 3 is a block diagram showing the steps for detecting the running speed of a sledge motor within an optical disk system according to this invention.

In step S100 of FIG. 3, the optical disk system branches to step S102 as soon as a track jump signal is received, otherwise, the system branches to the end and terminates the controlling flow.

In step S102, the received tracking output signal TRO is expanded into an orthogonal space. For example, a Fourier analysis of the TRO signal can be carried out so that the TRO signal is expanded using the orthogonal properties of sine and cosine functions. Amplitude and phase of the TRO signal is difficult to decide. However, magnitude and phase can be easily obtained after the TRO signal is expanded in sine-cosine orthogonal space. In general, the expanded TRO signal in sine-cosine space is represented using the formula A sin (ω+Φ), where A is the amplitude, Φ is the phase angle andΦ is the angular speed.

After the tracking output signal TRO has expanded in sine-cosine space, signal analysis method is used in step S104 to calculate the magnitude A and the phase angleΦ. The calculated value of A and the phase angleΦ are stored in a memory device such as a memory unit, a register or a buffer. The stored magnitude A and phase angleΦ serve as emulation parameters in simulating the pseudo-tracking servo output (PTRO) signal.

In step S106, the calculated A and phase angleΦ are used to obtain PTRO signal in each sampling time t. In each sampling interval t, the simulated parameters are kept unchanged. The A and the phase angleΦ needs to be calculated only once when track-jumping signal is first received. Furthermore, the same A and phase angleΦ are used in subsequent sampling. Hence, the method for computing the pseudo-tracking output signal PTRO is very much simplified.

In step S108, the computed pseudo-tracking servo output (PTRO) signal is combined with the tracking servo output (TRO) signal so that the actuator speed signal and disk run-out speed signal within the velocity feedback signals are deleted. Consequently, running speed of the motor is obtained. In other words, the reference motor speed essential for track jumping is accurately determined so that error-free track jumping can be obtained.

In the aforementioned method, the computed pseudo-tracking output (PTRO) signal is obtained by projecting the TRO signal onto the orthogonal functional space. The method actually has wider application and hence waveform of the TRO signal is unrestricted.

If waveform of the TRO signal is a pure sine wave or a pure cosine wave, the TRO signal can be simulated using the following formula:

$$y(n)=2\cos(\omega T)y(n-1)-y(n-2),$$

where ω is the angular velocity.

In the above formula, recursive process is used to expand the TRO signal. Since waveform of the TRO signal is a pure sine or cosine wave, the variations of magnitude A and phase angle(D are hidden in the formula. Ultimately, the pseudo-tracking output (PTRO) signal can be simulated in each sampling time.

In summary, the advantages of the invention for detecting the running speed of sledge motor in an optical disk system include:

1. The actual running speed of a sledge motor is detected by removing velocity feedback signal produced by other elements.

2. This invention provides a method for controlling an optical disk system. By eliminating other velocity feedback signals contributed by other sources, actual running speed of the motor can be obtained.

3. This invention provides a method for detecting the absolute running speed of a sledge motor within an optical disk system by simulating the tracking servo output signal. Consequently, only the velocity feedback signal produced by the sledge motor is retained and hence accurate track jumping is obtained.

4. Using simulation and only simple parameters in computation, an accurate running speed of the sledge motor is obtained.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for detecting the speed of a sledge motor in an optical storage device, comprising the steps of:

in response to a track jumping command, expanding a tracking servo output signal onto an orthogonal space to obtain simulation parameters corresponding to the tracking servo output signal;

generating a pseudo-tracking servo output signal based on the simulation parameters of the tracking servo output signal; and using the pseudo-tracking servo output signal to compute the speed of the sledge motor.

2. The method of claim 1, wherein the orthogonal space is a sine-cosine space.

3. The method of claim 1, wherein the simulation parameters comprises an amplitude and a phase of the tracking servo output signal.

4. The method of claim 2, wherein the magnitude and phase angle of both the pseudo-tracking servo output signal and the tracking servo output signal are identical.

5. The method of claim 1, further comprising a step of eliminating an actuator speed and a run-out speed of the optical disk based on the pseudo-tracking servo output signal.

6. A method for detecting the speed of a sledge motor in an optical storage device, wherein the optical storage device is operated in constant angular speed and the velocity feedback signal of the optical storage device includes a speed from the sledge motor and a second speed, the method comprising:

in response to a track-jumping signal, expanding a tracking servo output signal from the optical storage device onto an orthogonal space to obtain simulation parameters corresponding to the tracking servo output signal;

generating a pseudo-tracking servo output signal based on the simulation parameters of the tracking servo output signal; and using the pseudo-tracking servo output signal to eliminate the second speed so that the speed of the sledge motor is derived.

7. The method of claim 6, wherein the orthogonal space is a sine-cosine space.

8. The method of claim 6, wherein the simulation parameters comprises an amplitude and a phase of the tracking servo output signal.

9. The method of claim 7, wherein the magnitude and phase angle of both the pseudo-tracking servo output signal and the tracking servo output signal are identical.

10. The method of claim 6, wherein the second speed comprises an actuator speed and a run-out speed of the optical storage device.

11. A method for detecting the running speed of a motor in a tracking servo system, comprising the steps of:

in response to a track jumping command, expanding a tracking servo output signal onto an orthogonal space to obtain simulation parameters of the tracking servo output signal;

generating a pseudo-tracking servo output signal based on the simulation parameters of the tracking servo output signal; and using the pseudo-tracking servo output signal to compute the running speed of the motor.

12. The method of claim 11, wherein the orthogonal space is a sine-cosine space.

13. The method of claim 12, wherein the magnitude and phase angle of both the pseudo-tracking servo output signal and the tracking servo output signal are identical and expands in the sine-cosine space.

14. The method of claim 11, wherein the simulation parameters comprises an amplitude and a phase of the tracking servo output signal.

15. The method of claim 11, further comprising a step of eliminating an actuator speed and a run-out speed based on the pseudo-tracking servo output signal.

* * * * *